(12) United States Patent
Houston

(10) Patent No.: US 6,307,281 B1
(45) Date of Patent: Oct. 23, 2001

(54) SYSTEM AND METHOD FOR REDUCING POWER DISSIPATION IN A CIRCUIT

(75) Inventor: Theodore W. Houston, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/379,667

(22) Filed: Aug. 24, 1999

Related U.S. Application Data
(60) Provisional application No. 60/068,646, filed on Dec. 23, 1997, now Pat. No. 6,219,796.

(51) Int. Cl.$^7$ .................................................. H02J 1/00
(52) U.S. Cl. ........................................ 307/31; 307/39
(58) Field of Search .................... 307/29, 31, 39, 307/81; 713/322; 395/750

(56) References Cited

U.S. PATENT DOCUMENTS

| | | |
|---|---|---|
| 5,452,401 * | 9/1995 | Lin ......................................... 395/750 |
| 5,495,617 | 2/1996 | Yamada . |
| 5,584,031 | 12/1996 | Burch et al. . |
| 5,666,537 * | 9/1997 | Debnath et al. ................ 395/750.04 |
| 5,887,179 * | 3/1999 | Halahmi et al. ................ 395/750.06 |
| 5,983,357 * | 11/1999 | Sun ...................................... 713/324 |
| 6,052,792 * | 4/2000 | Mensch, Jr. ......................... 713/322 |
| 6,219,796 | 4/2001 | Bartley . |

* cited by examiner

*Primary Examiner*—Josie Ballato
*Assistant Examiner*—Sharon Polk
(74) *Attorney, Agent, or Firm*—Robert D. Marshall, Jr.; W. James Brady, III; Frederick J. Telecky, Jr.

(57) ABSTRACT

A method for selective allocation of power to elements of a circuit comprises identifying at least one element of the circuit for reduced power dissipation and selecting the at least one element. The method further comprises altering an input to the at least one element thereby reducing the power dissipated by the at least one element.

26 Claims, 3 Drawing Sheets

SYSTEM AND METHOD FOR REDUCING POWER DISSIPATION IN A CIRCUIT

RELATED APPLICATIONS

This application is related to U.S. patent application Ser. No. 60/068,646, filed on Dec. 23, 1997, by David H. Bartley, now U.S. Pat. No. 6,219,796 and entitled "Power Reduction for Processors by Software Control of Functional Units."

TECHNICAL FIELD OF THE INVENTION

The invention relates in general to the field of electronic devices and more specifically to a system and method for reducing power dissipation in a circuit.

BACKGROUND OF THE INVENTION

Reducing power dissipation is an important concern in processor and circuit design. Increases in the density of microelectronic devices and the related need to minimize the heat generated by such devices provides one major impetus for such reduction. Reducing the amount of power dissipated at a microelectronic level can greatly reduce excess heat that may adversely impact both a product's performance and lifespan. The need to minimize power usage in mobile electronics and other battery-operated devices further provides impetus for reducing power dissipation. Additionally, the introduction of specialized circuitry to processors and other circuits prompts heightened concern about power dissipation. Such circuits, while providing improved performance and increased functionality, generally dissipate comparatively large amounts of power.

From the standpoint of processor or circuit design, a number of techniques have been used to reduce power usage. These techniques can be grouped into two basic strategies. First, the processor's circuitry is designed to use less power. Second, the processor is designed in a manner that permits power usage to be managed.

In the past, managing power usage has been primarily at the system level. Various "power down" and "sleep" modes have been implemented that permit large system components such as a disk drive, display, or the processor itself, to be intermittently powered down. Other application specific circuits or general processors have been introduced which similarly engage "stand by" modes wherein the majority of system level components in an application specific circuit or general processor are shut down while waiting for a real time interrupt or event. For example, a cellular phone may enter standby mode while waiting to receive an incoming call or message.

The entry of a device into a power down mode can be initiated in various ways, such as in response to a timer or in response to a processor instruction or real time interrupt. For example, a device may enter into a power down mode after it has been inactive for a preset period. Or, instruction-implemented power management may be developed to place power management under processor control. One such standard using instruction-implemented power management is the Advanced Power Management™ interface specification, developed jointly by Intel® and Microsoft®.

One approach to processor power management is described in U.S. Pat. No. 5,584,031, entitled "System and Method of Executing a Low Powered Delay Instruction." In this approach, a special instruction specifies a number of timing cycles during which activity of a central processing unit is delayed.

Another approach to processor power management is described in U.S. Pat. No. 5,495,617, entitled "On Demand Powering of Necessary Portions of Execution Unit by Decoding Instruction Word Field Indications Which Unit is Required for Execution". An instruction coder differentiates "control" instructions from "execute" instructions. If the instruction is a "control" instruction, it does not involve the execution unit and a standby signal can be sent to the execution unit.

These known systems and methods described above have limitations and disadvantages making them unsatisfactory alternatives for achieving reduced power dissipation in some circuits.

SUMMARY OF THE INVENTION

While the power management systems described above allocate control of power to a processor such that the powering down of a central processing unit or execution unit can be accomplished, neither of such systems provide the capability of reducing the power dissipated in individual elements of such central processing unit or execution unit. For example, a typical execution unit may include an arithmetic logic unit, an accumulator, a temporary register, a read controller, a micro-program address register, and other functional units used in execution. Neither U.S. Pat. No. 5,584,031 nor U.S. Pat. No. 5,495,617 provides for reducing the power dissipated by these individual elements in an execution unit or other system component.

Accordingly, a need has arisen for an improved system and method for reducing power dissipation in a circuit. The present invention provides a system and method for reducing power dissipation in a circuit that addresses shortcomings of prior systems and methods in addressing power dissipation in a circuit.

According to one embodiment of the invention, a method for selective allocation of power to elements of a circuit identifies at least one element of the circuit for reduced power dissipation and selects the at least one element. The method alters an input to the at least one element thereby reducing the power dissipated by the at least one element.

According to another embodiment of the invention, a system for the selective allocation of power to elements of a circuit comprises a logic component that is operable to identify at least one element of the circuit for reduced power dissipation. The system further comprises a selection signal generated by the logic component that is operable to select the identified at least one element and a control interface that is operable to reduce the power dissipated by the selected element in response to the selection signal.

In yet another embodiment of the present invention, a system for selectively reducing power dissipation in elements of a circuit comprises a logic component that is operable to identify at least one element of a circuit for reduced power dissipation, the logic component identifying the at least one element in response to analyzing instructions processed by an instruction handler. The system further comprises a selection signal generated by the logic component that is operable to select the identified at least one element and a control interface that is operable to alter an input to the identified at least one element in response to the selection signal and thereby cause the identified at least one element to enter a reduced power dissipation mode.

Various embodiments of the invention provide some or all of the following technical advantages. For example, power management is provided at an "on-chip" level as compared to a computer system level. The present invention also provides the advantage of applying power management to individual elements within a circuit. A further advantage of the present invention is the ability to reduce power dissipation in an element of a circuit without reducing the power supply of that element. A further advantage of the present invention is that an individual element within a processor or circuit can have its power supply turned off or significantly reduced without impacting the operation of the rest of the processor or circuit. Yet another advantage of the present invention is allowing more widespread use of specialized on-chip circuitry. For example, circuits for performing floating point operations, Fourier transforms and digital signal filtering can be included on-chip without incurring a significant increase in power dissipation during the operation of the circuit. Such specialized circuitry may function on reduced power or may be powered down except during time intervals when their functionality is required.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 9 of the drawings, like numerals being used for like and corresponding parts of the various drawings.

Figure 1:
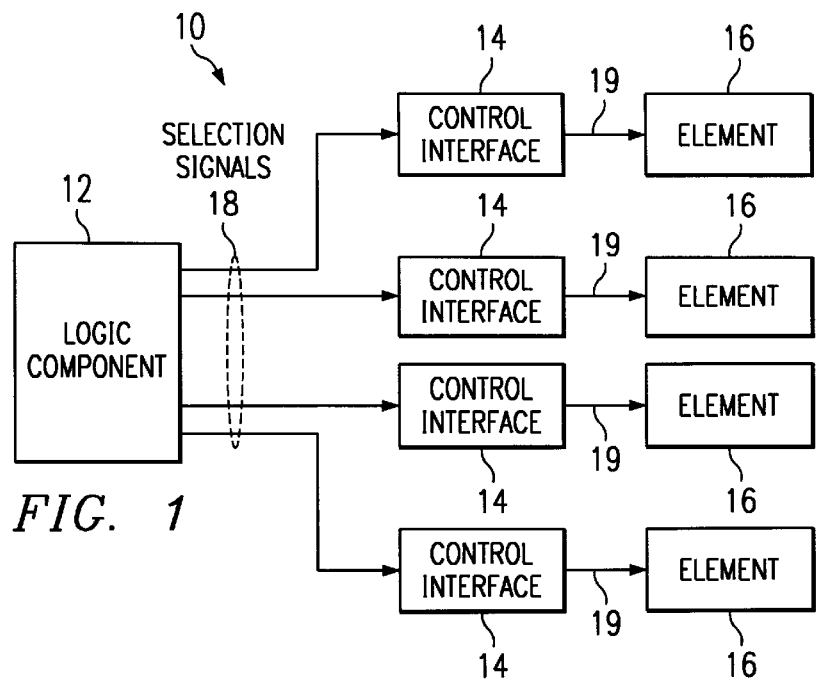
FIG. 1 is a simplified block diagram of a system for the strategic allocation of power to elements of a circuit according to the teachings of the present invention.

FIG. 1 is a simplified block diagram of a system 10 for the selective allocation of power to a plurality of elements 16 of a circuit such as an integrated circuit, for example. System 10 includes a logic component 12 coupled to a plurality of control interfaces 14, the outputs of which are connected the plurality of elements 16. Generally, system 10 reduces the power dissipated in a circuit using logic component 12 to communicate with control interfaces 14 in order to reduce the power dissipated by one or more selected elements 16.

Logic component 12 may include a processor, instruction handler, and/or any combination of discrete or integrated logic. A processor, as used in reference to logic component 12 and throughout the detailed description herein, refers to any microcontroller, digital signal processor, application specific processor or general purpose computing processor. Logic component 12 may in turn be one component of a larger circuit or computing device. One embodiment of logic component 12 is described in FIG. 2 in the context of a larger system.

Logic component 12 determines intervals of time or series of operations in which a specific element 16 is unlikely to be utilized, utilized only infrequently, or utilized not only during an operation or situation that is not time critical, or can be allotted an extended time for execution, for example a speculative execution, hereinafter referred to as an element being inactive. Logic component 12 then sends a selection signal 18 from logic component 12 to one of control interfaces 14 associated with the specific element 16. More specifically, logic component 12 determines when circuit operation, executable instructions or other system tasks or operations do not require more than infrequent use of specific elements 16. Logic component 12 then generates one or more selection signals 18 to one or more control interfaces 14 associated with any element 16 affected or unused by upcoming circuit operation or instruction execution. For example, selection signal 18 may be generated at the beginning of an interval of time in which a specific element 16 will not be utilized to instruct the specific element 16 to enter a reduced power dissipation mode, and again when the interval of time has expired to instruct the specific element 16 to exit the reduced power dissipation mode.

In one embodiment, logic component 12 may determine periods of infrequent use of specific elements 16 by analyzing coded instructions or in response to specific power down instructions. Logic component 12 may also utilize timing devices, clocks, interrupts, flags, specific events, or other indicators to send selection signal 18. Depending on the particular system, circuit, or processing platform, any of such means may be utilized alone or in combination. For example, a circuit operating in three modes may send selection signals 18 to a plurality of elements 16 upon entering a specific mode where such elements 16 are not used. A similar selection signal 18 may be sent to a specific element 16 after a predetermined number of clock cycles has expired without the specific element 16 being accessed.

Each control interface 14 may comprise any combination of control logic and circuitry. For example, an interface 14 may comprise a register providing an input to an analog or digital circuit including transistors, inverters, and other electronic components. The combination of the register and other circuit components comprising the interface are operable to alter at least one input 19 to a particular element 16. The altered input reduces the power dissipated by that element 16. Alternatively, selection signal 18 originating from logic component 12 may cause a specific interface 14 to alter input 19 to a specific element 16 such that element 16 returns to a state where power dissipation is not reduced. In this manner, selection signals 18 may cause one of the plurality of control interfaces 14 to alter input 19 to a specific element 16 such that element 16 operates in a mode whereby power is dissipated at a normal rate or in a mode whereby power is dissipated at a reduced rate.

Element 16 may comprise any discrete device or combination of discrete devices located within a circuit and utilized by the circuit in the performance of operations, executed instructions, or additional functionality. Element 16 is not a system, subsystem, or complete processing or execution unit. For example, a specific element 16 may include devices such as a register, multiplier, adder, arithmetic logic unit, accumulator, read controller, microprogram address register, transistor, capacitor, resistor, logic gate, latch, switching element, flip-flop, other active or passive electronic device, or combination of such devices. Element 16 itself may include a plurality of devices working in combination to perform the equivalent function of another device. For example, in one embodiment, element 16 may include a data path having a multiplier in parallel with a data path having a shift register and an adder. Both data paths have equivalent functions. As noted, element 16 does not include subsystems such as a monitor or hard disk drive on a computer, or a voice circuit on a cellular phone, but may include individual circuit elements that are imbedded within a hard disk drive controller or voice circuit. One or more elements 16 may respond to signals received directly from logic component 12 without the use of control interface 14. It should be noted that not all of elements of a circuit are necessarily capable of entering a reduced power dissipation mode.

Figure 2:
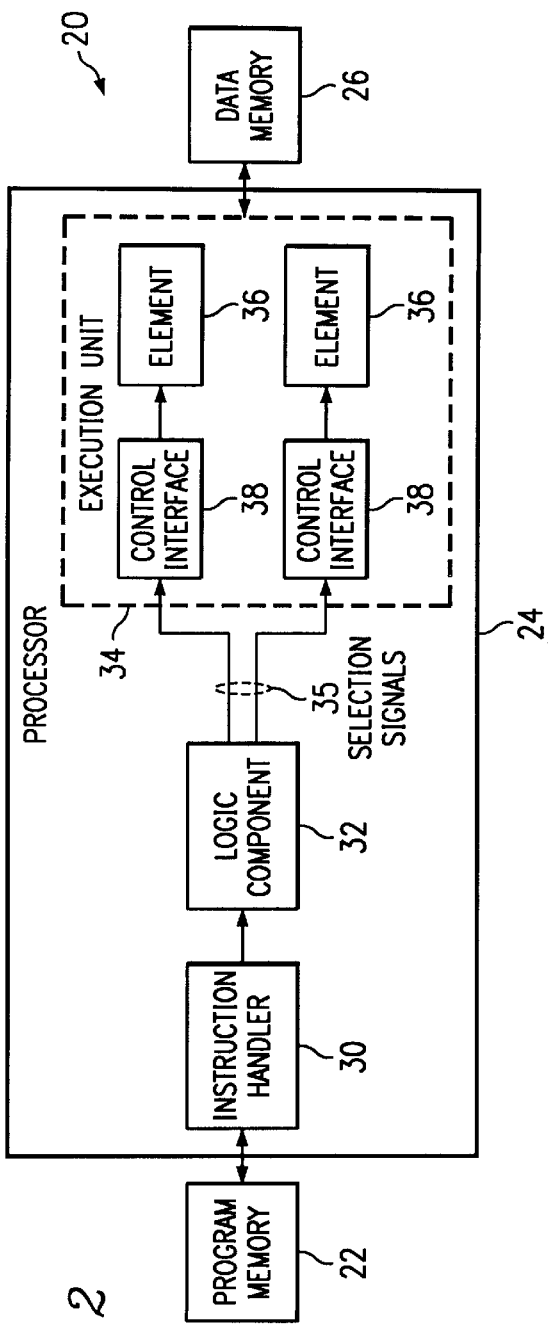
FIG. 2 is a block diagram of an embodiment of the present invention in the context of a computing device.

FIG. 2 is a block diagram of an embodiment of the present invention in the context of a computing device 20. Computing device 20 comprises a processor 24 coupled to a program memory 22 and a data memory 26. Processor 24 fetches, compiles, assembles, links and executes instructions or modules contained within program memory 22. Such instructions may manipulate data stored in data memory 26. Both program memory 22 and data memory 26 may include any combination of memory devices or circuits including stacks, registers, queues, libraries and/or any other suitable structure for retaining data or coded instructions.

Processor 24 includes instruction handler 30, logic component 32, and execution unit 34. Processor 24 may include other structures not shown in FIG. 2 such as timers and a control unit to configure and control various processor operations. Processor 24 may further interact with peripheral circuitry and components not shown in FIG. 2 which may vary depending on the type of processor used. As previously discussed, processor 24 may be of any suitable structure for performing the described invention and the structure described below is intended only to illustrate one suggested implementation of the invention.

Instruction handler 30 includes necessary components to fetch instructions from program memory 22 and interpret such instructions. In general, instruction handler retrieves, queues, and examines coded instructions, translates the instructions into a format understandable by execution unit 34, and forwards such instructions for execution to execution unit 34 through logic component 32.

Logic component 32 may comprise any combination of hardware and software capable of receiving a fetched instruction from instruction handler 30 and determining based on that instruction which elements 36 of execution unit 34 will be used to execute the instruction. In one embodiment, logic component 32 inspects instructions in an execution queue in order to determine which elements 36 such instructions shall utilize. As such, logic component 32 also includes discrete logic and/or processing components that are capable of sending a selection signal 35 to each element 36 of execution unit 34. In one embodiment, logic component 32 is integrated with instruction handler 30. Logic component 32 may also be used in combination with a compiler or assembler that is equipped with optimization processes operable to identify and select elements 36 which are inactive during certain sequences of instructions, or can identify operations that can be allotted extended time for execution.

Execution unit 34 includes elements 36 and associated control interfaces 38 coupled thereto. Elements 36 may include any combination of devices or smaller logical components used to execute an instruction in a processor. For example, elements 36 may include an arithmetic logic unit, or individual adders, multipliers, registers or other discreet logic either alone or in combination with other devices. Within each element 36, devices may be structured in a serial relationship or in parallel as shown in FIGS. 3 through 9 and described below. For example, one element 36 may include a shift register and adder operating on a single data path, or may include the same serial data path and its corresponding adder and shift register in parallel with an alternative data path including only a multiplier. Regardless of whether or not a specific element 36 comprises a single component or a combination of components, and regardless of whether or not element 36 contains one serial data path or alternative parallel data paths in combination, element 36 will be referred to as a single element interfaced to logic component 32 by control interface 38.

Control interface 38 may include any combination of logic, circuitry, or other interface means coupling a specific element 36 to logic component 32. Control interface 38 provides the necessary connection and input selection structure necessary to reduce the amount of power dissipated by element 36 during selected intervals of time. Element 36 may include additional characteristics and/or components enabling it to interface with other elements while operating in a reduced power dissipation mode. For example, element 36 may include an interface circuit to accommodate operating at a lower voltage then other elements with which it interfaces during reduced power dissipation mode. Element 36 may also include additional components such as well contacts or supplementary transistors further enabling operation in reduced power dissipation mode.

In general, control interface 38 receives selection signal 35 from logic component 32 and alters an input to element 36 in response to selection signal 35. The altered input to element 36 reduces the power dissipated by element 36 until the selection signal 35 provided to that control interface 38 changes. More specifically, logic component 32 may alternately send a specific selection signal 35 to control interface 38 signifying a need for reduced power dissipation, stop sending the specific selection signal 35, and then send a different selection signal 35 to control interface 38 signifying that reduced power dissipation is no longer desired. As described below by referring to FIGS. 3 through 9, control interface 38 may, in response to selection signal 35, change the voltage source supplied to an element 36, modify voltage level supplied to the specific element 36, alter a clock signal provided to element 36, select a specific data path within element 36 by which any instructions utilizing element 36 will pass, and/or otherwise alter the performance characteristics of a specific element 36 such that power is dissipated at a reduced rate.

The present invention contemplates several embodiments directed towards determining when a specific element 36 of execution unit 34 will be selected for reduced power dissipation via selection signal 35. In one embodiment of the present invention, logic component 32 sends a selection signal 35 to a specific element 36 based on a power down instruction handled and forwarded by instruction handler 30. The power down instruction may specify a particular element 36 to be powered down. The term powered down means that element 36 shall operate in a mode whereby less power is dissipated by element 36, hereinafter sometimes referred to as a reduced power dissipation mode. The power down instruction may be inserted into executable code by a specialized process of a compiler or assembler in response to examining coded instructions and determining intervals in which a specific element will be inactive during execution. Such a process would insert power down instructions at the beginning of the interval of inactivity and insert related power up instructions when such intervals expire.

In another embodiment, logic component 32 analyzes instructions handled by instruction handler 30 and determines which elements 36 will not be used in executing a specific instruction or a particular series of instructions. Logic component 32 then sends a selection signal 35 to elements 36 according to this analysis.

In one embodiment, logic component 32 may send a selection signal 35 to a particular element 36 after a predetermined interval has elapsed, whether such interval is based on expired clock cycles or instructions processed, wherein no instructions handled during such interval required operation of the specific element 36. In this manner specific elements 36 that are rarely used in general processing or that are used only during specific operations can be selected for reduced power dissipation. An instruction can also be used to terminate a reduced power mode.

Logic component 32 may also perform a predictive analysis. Such analysis involves the recognition of those instructions that begin the execution of specific sequences of operations known not to involve the use of specific elements 36. Such elements can then be selected for reduced power dissipation for the duration of the sequence of operations. In such a manner, logic component 32 does not have to initiate a selection signal 35 after analyzing each instruction, but instead looks for particular instructions that flag the beginning of a particular series of operations and sends a selection signal 35 to a particular element 36 for reduced power dissipation for the duration of the operation sequence.

Logic component 32 can also utilize pattern recognition and pattern matching of a series of instructions as they are handled. A sequence of instructions currently analyzed by logic component 32 can be compared to stored or previously analyzed instruction sequences and a selection signal 35 can then be sent to elements 36 which have been previously recognized to be inactive during this particular sequence. For example, if one or more instructions handled by instruction handler 30 match a pattern of instructions common to a lengthy data transfer or memory access process, logic component 32 may send a selection signal 35 to specific elements 36 associated with an arithmetic logic unit, for example, that will not be used, in order to reduce the power dissipated by such elements 36. Similarly logic component 32 may send a selection signal 35 to elements 36 to indicate that reduced power dissipation is no longer desired.

Notably, logic component 32 need not be completely robust in predicting the usage of elements 36. In many embodiments, a specific element 36 operating at a lower rate of power dissipation may be fully functional, although at a lower operational speed. Thus, if a specific element 36 is used infrequently in a particular operation or execution, operating the specific element 36 in a reduced power dissipation mode may substantially decrease the power dissipated with only a marginal reduction in the overall performance characteristics of system 20.

Figure 3:
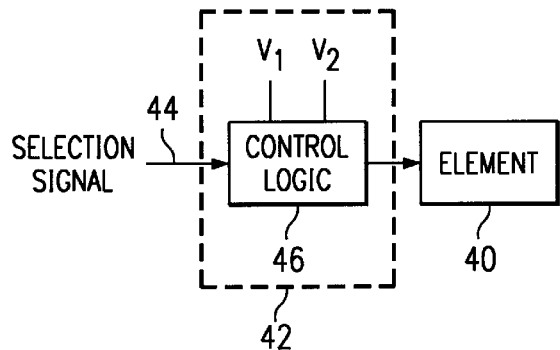
FIG. 3 is a block diagram of one configuration of an element and a corresponding control interface according to the teachings of the present invention.

FIG. 3 is a block diagram of one configuration of an element 40 and a corresponding control interface 42 according to the teachings of the present invention. Control interface 42 includes control logic 46 which receives a selection signal 44, a first voltage signal $V_1$ and a second voltage signal $V_2$, where $V_1 \neq V_2$. Control interface 42 has as an input a selection signal 44. Generally, control interface 42 receives selection signal 44 which is operable to cause either voltage signal $V_1$ or $V_2$ to be used as a voltage supply to element 40. By controlling the voltage supply to element 40, control interface 42 can adjust the amount of power dissipated by element 40.

Control logic 46 may include any combination of inverters or transistors, or other discreet or integrated logic capable of providing the means to generate an output of either voltage signal $V_1$ or $V_2$ to element 40. For example, control logic 46 may include a multiplexer operable to select $V_1$ or $V_2$ as an output in response to selection signal 44.

Selection signal 44 may be generated by a logic component such as logic component 12 of FIG. 1 or logic component 32 of FIG. 2, as are the selection signals discussed below in reference to FIGS. 4 through 9. Voltage input signals $V_1$ and $V_2$ are at different voltage levels such that a lesser input voltage level can be selected by control logic 46 as an output during intervals where reduced power dissipation is desired for element 40. The lesser input voltage is then used as a voltage supply for element 40 for the duration of the interval wherein reduced power dissipation is desired.

Figure 4:
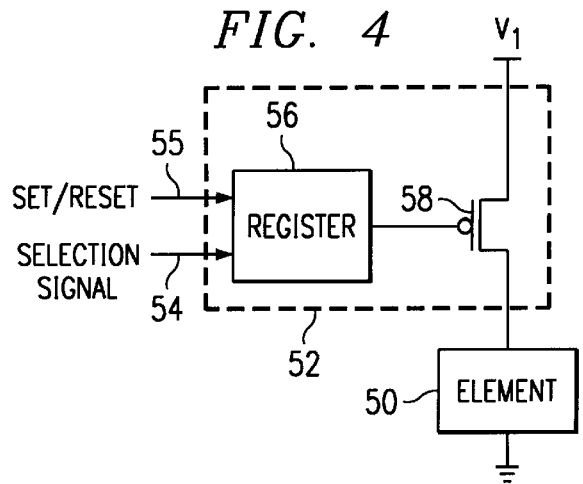
FIG. 4 is a block diagram of an alternative configuration of an element and a corresponding control interface according to the teachings of the present invention.

FIG. 4 is a block diagram of an alternative configuration of an element 50 and a corresponding control interface 52 according to the teachings of the present invention. Control interface 52 includes a register 56 coupled to a transistor 58. Register 56 receives a selection signal 54 and a set/reset signal 55, and generates an output that is coupled to the gate of transistor 58. Transistor 58 connects voltage signal V1 to element 50. Generally, control interface 52 controls whether or not element 50 is supplied by voltage signal $V_1$ by turning on and off transistor 58 in response to an output generated by register 56 in response to signals 54 and 55. By shutting off the voltage supply to element 50, control interface 52 can substantially eliminate power dissipation through element 50 during intervals wherein operation of element 50 is unnecessary.

Register 56 may comprise, for example, a latch, flip flop, or other means of maintaining an input until register 56 is reset. Each time a predetermined voltage level is seen at set/reset signal 55, register 56 samples selection signal 54 and holds the value of selection signal 54 at the output of register 56 until register 56 is reset. Like selection signal 54, set/reset signal 55 may be generated by a logic component such as logic component 12 of FIG. 1 or logic component 32 of FIG. 2, as are the set/reset signals discussed below in reference to FIGS. 4 through 9.

In addition to receiving an output from register 56, transistor 58 is also connected to a voltage signal $V_1$ and element 50. Transistor 58 essentially acts as a switch so that when transistor 58 is on, voltage signal $V_1$ is supplied to element 50. When transistor 58 is off, voltage signal $V_1$ is cut off from element 50, thereby substantially eliminating any power dissipation through element 50 during intervals of time when element 50 is known not to be used.

Register 56 and transistor 58 may be substituted by any switching or selection means comparable to connect and disconnect a voltage supply to element 50.

Figure 5:
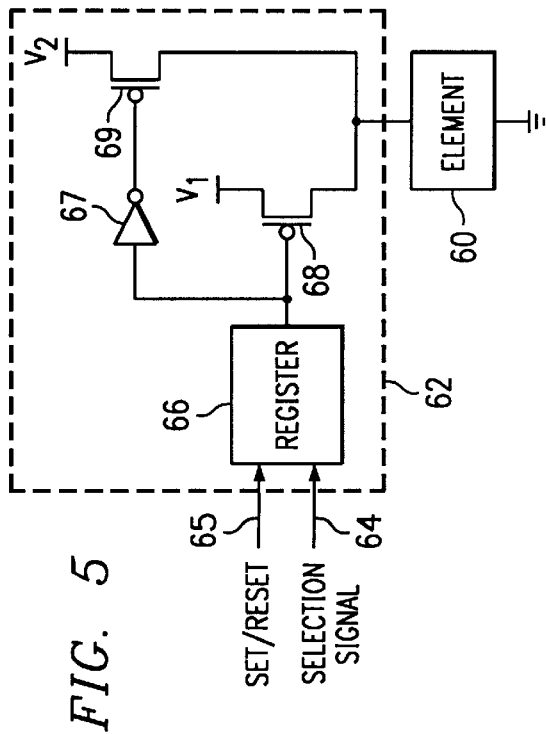
FIG. 5 is a block diagram of another alternative configuration of an element and a corresponding control interface according to the teachings of the present invention.

FIG. 5 is a block diagram of another alternative configuration of an element 60 and a corresponding control interface 62 according to the teachings of the present invention. Control interface 62 includes a register 66, an inverter 67, two transistors 68 and 69, and voltage inputs $V_1$ and $V_2$. Register 66 has as inputs a selection signal 64 and a set/reset signal 65 and is connected at its output to inverter 67 and the gate of transistor 68. Inverter 67 is in turn connected to the gate transistor 69. Transistor 68 links voltage signal $V_1$ and element 60, while transistor 69 links voltage signal $V_2$ and element 60. Generally, control interface 62. controls whether element 60 is supplied by voltage signal $V_1$ or $V_2$ by supplying an output from register 66 that results in one of transistors 68 or 69 being turned on and the other transistor being turned off. If transistor 68 is on, element 60 will be supplied by voltage signal $V_1$. If transistor 69 is on, element 60 will be supplied by voltage signal $V_2$. By controlling the voltage supply to element 60, control interface 62 can adjust the amount of power dissipated by element 60.

Selection signal 64, set/reset signal 65 and register 66 may operate similarly to register 56 and signals 54 and 55 in FIG. 4 in order to receive and hold a selection signal 64 at the output of register 66. As selection signal 64 may be of low or high logic level, the output of register therefore will also be at a high or low voltage level. Inverter 67 ensures that transistors 68 and 69 will always see opposite voltage levels at their gate terminals. For example, when the voltage level at the gate of transistor 68 is high, inverter translates that high voltage level to a low voltage level at the gate of transistor 69. Thus, only one of such transistors will be on at any given time, thereby operating to select voltage signal $V_1$ or $V_2$ as a voltage supply to element 60 in order to vary the rate of power dissipation.

Additionally, control interface 62 may be altered to adjust a threshold voltage, such as by adjusting the well voltage, of any or all transistors within element 60 in response to selection signal 64. Such an embodiment could be identical or equivalent to control interface 62 in configuration, with an exception being that the input to element 60 would not be a voltage supply input for element 60 but a voltage input supplying or altering the well voltage of transistors within element 60. In one embodiment, control interface 62 includes a voltage regulator capable of regulating the well voltage of transistors in element 60.

Figure 6:
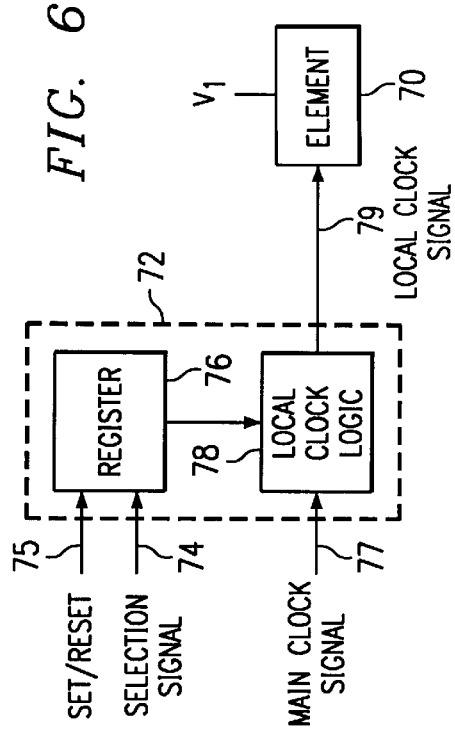
FIG. 6 is a block diagram of yet another alternative configuration of an element and a corresponding control interface according to the teachings of the present invention.

FIG. 6 is a block diagram of yet another alternative embodiment of an element 70 and a corresponding control interface 72 according to the teachings of the present invention. Control interface 72 includes a register 76 coupled to a local clock logic 78. Register 76 receives as inputs a selection signal 74 and a set/reset signal 75. The output of register 76 is connected as an input to local clock logic 78. Local clock logic 78 has an additional input of main clock signal 77 and generates a local clock signal 79 at its output to element 70. Generally, control interface 72 adjusts the frequency of local clock signal 79 supplied to element 70 by manipulating main clock signal 77 in response to selection signal 74. Alternatively, control interface 72 may cause local clock signal 79 to be idle, and thus generate no clock signal. By adjusting the frequency of the local clock signal 79, the amount of power dissipated by element 70 can be significantly reduced during intervals in which element 70 is inactive in a circuit.

In operation, selection signal 74 and set/reset signal 75 cause register 76 to accept and hold changes in selection signal 74 indicative of when reduced power dissipation is desired for element 70. When a particular selection signal 74 is held at the output of register 76 it is received by local clock logic 78. Depending on the voltage level of this held selection signal, main clock signal 77 may or may not be modified in frequency by local clock logic 78 before being supplied as local clock signal 79 to element 70. A lower frequency clock signal supplied by local clock signal 79 to element 70 will reduce the amount of power dissipated by element 70. The combination of reduced voltage and reduced clock frequency can be particularly effective.

Figure 7:
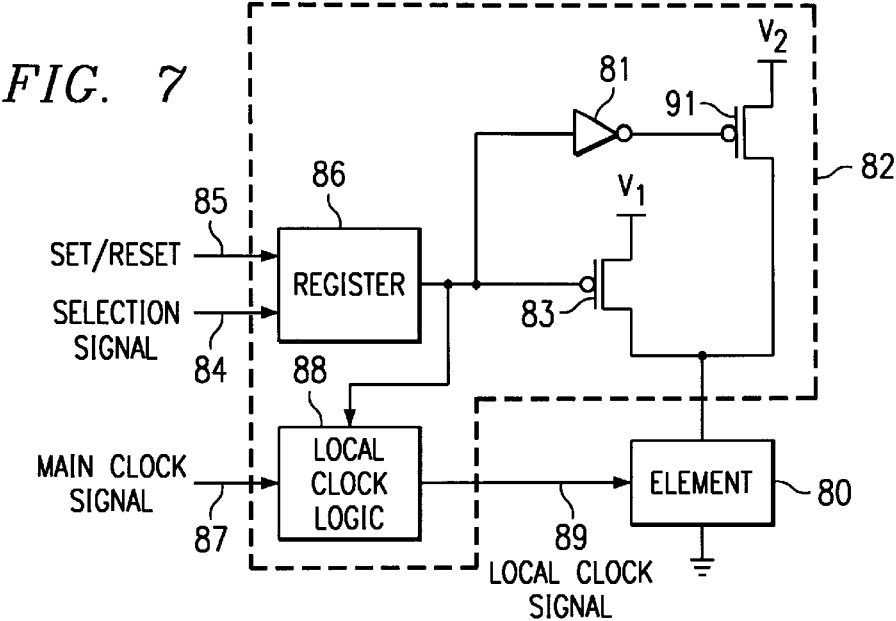
FIG. 7 is a block diagram of another configuration of an element and a corresponding control interface according to the teachings of the present invention.

FIG. 7 is a block diagram of another circuit configuration of an element 80 and a corresponding control interface 82 according to the teachings of the present invention. This control interface configuration combines features of interfaces 62 and 72 described above in reference to FIGS. 5 and 6. Control interface 82 includes a register 86 coupled to a local clock logic 88, and an inverter 81 coupled to the output of register 86. Register 86 receives a selection signal 84 and a set/reset signal 85. Control interface 82 receives a selection signal 84, a set/reset signal 85 and a main clock signal 87, and generates a local clock signal output 89 to element 80. Generally, control interface 82 both selects a voltage supply $V_1$ or $V_2$ for element 80 and a frequency for the clock input of element 80 in response to selection signal 84 that is received and held by register 86. By switching voltage supplies and altering the frequency of the clock signal used by element 80, control interface 82 can adjust the amount of power dissipated by element 80.

As described above in reference to FIG. 6, signals 84 and 85, register 86, main clock signal 87, local clock logic 88 and local clock signal 89 cooperate to reduce power dissipation in element 80 by reducing the frequency of the clock input supplying element 80. Additionally, as described above in reference to FIG. 5, signals 84 and 85, register 86, inverter 81, transistors 83 and 91, and voltage signals $V_1$ and $V_2$ cooperate to reduce power dissipation in element 80 by allowing element 80 to use a lower voltage supply during intervals in which element 80 is inactive. Thus, power dissipation in element 80 is reduced by reducing the magnitude of both the clock input frequency and the voltage input supplied to element 80. Power dissipation in element 80 could alternatively be reduced by controlling the well voltage to raise the threshold voltages of transistors in element 80.

Figure 8:
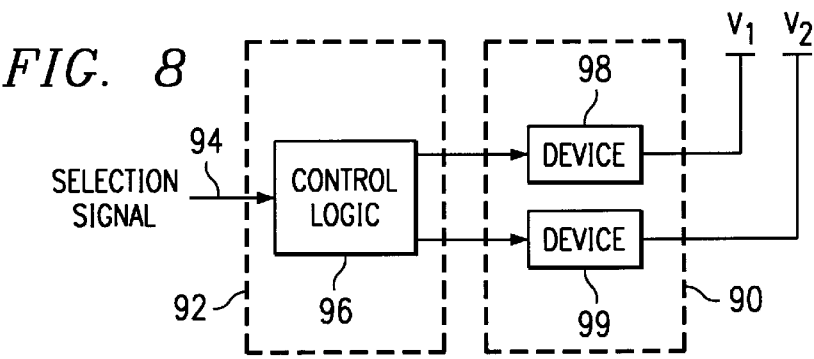
FIG. 8 is a block diagram of an additional configuration of an element and a corresponding control interface according to the teachings of the present invention.

FIG. 8 is a block diagram of yet another embodiment of the present invention. An element 90 includes devices 98 and 99 as alternate functionally equivalent and parallel data paths or execution elements. Control interface 92 includes a control logic 96 that may be a register receiving a set/reset signal and a multiplexer coupled thereto. Control logic 96 receives a selection signal 94 as an input. Control logic 96 has two output signals, one connected to each of devices 98 and 99. Device 98 is supplied by voltage input $V_1$. Device 99 is supplied by voltage input $V_2$.

Generally, control interface 92 selects device 98 or 99 within element 90 by altering the output signals of control logic 96 in response to selection signal 94. The selected device within element 90 becomes the active executing device for any execution or operation acting on or requiring element 90. By designing devices 98 and 99 such that one device uses less power than the other device, control interface 92 can control the amount of power dissipated by element 90. When a reduced power dissipation mode is desired, control interface 92 selects the device dissipating less power as the active device.

Devices 98 and 99 have several possible embodiments. In one embodiment, devices 98 and 99 can be identical devices supplied with variant input voltages $V_1$ and $V_2$. Alternatively, device 98 may include a combination of components different than the components of device 99, with both sets of components fulfilling equivalent functions. For example, device 98 may include a multiplier, while device 99 may include a shift register and an adder in series. The multiplier may perform functional operations at a faster speed but with greater power dissipation than the combination of the shift register and adder. Thus, device 99 containing the shift register and adder may be selected during intervals in which reduced power dissipation is desired. It should be noted that the shift register can be utilized for operations other than multiplication, and is therefore not necessarily powered down when the multiplier is utilized. Additionally, in such an example a shift register/adder combination may be selected for multiplication when a multiplier has been previously powered down. To avoid having to delay operation while the multiplier is powered on, the shift register/adder is selected to perform an equivalent operation. Devices 98 and 99 may also each include a plurality of transistors, the transistors being used by one of devices 98 and 99 having a higher threshold voltage than the transistors being used by the other device. The device having transistors with a higher threshold voltage may be selected during intervals in which reduced power dissipation for element 90 is desired.

Figure 9:
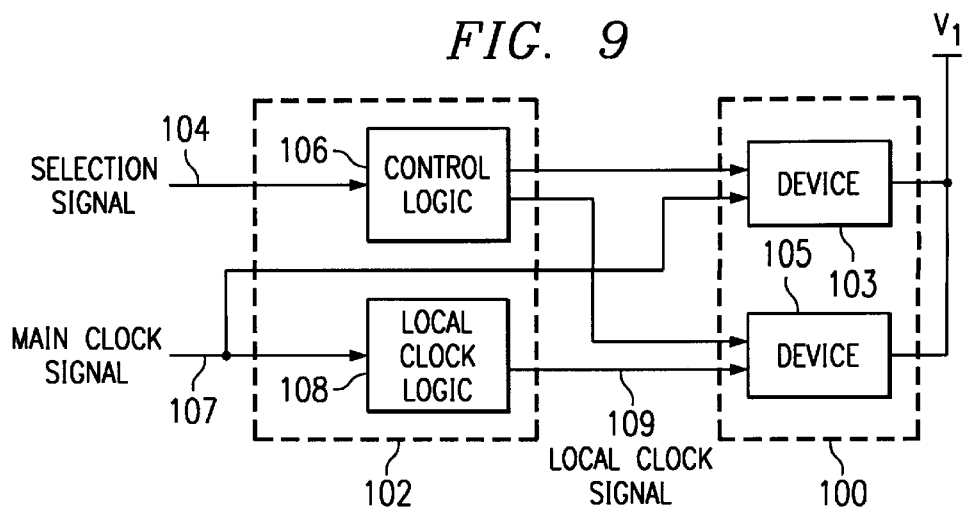
FIG. 9 is a block diagram of another alternative configuration of an element and a corresponding control interface according to the teachings of the present invention.

FIG. 9 is a block diagram of another embodiment of the present invention. An element 100 includes devices 103 and 105 as alternative and parallel data paths. Control interface 102 includes a control logic 106 that may include a register and a multiplexer. Control interface 102 further includes a local clock logic 108. Control logic 106 receives selection signal 104 and generates two control output signals, one connected to each of devices 103 and 105. Local clock logic 108 receives main clock signal 107 as an input and adjusts the frequency of main clock signal 107 to generate an output of a local clock signal 109 to device 105. Device 103 uses main clock signal 107 as a clock input signal. Device 105 uses local clock signal 109 as a clock input signal. Both devices 103 and 105 are supplied by voltage signal $V_1$. Generally, control interface 102 selects device 103 or 105 within element 100 by altering the output control signals of control logic 106 in response to selection signal 104. As devices 103 and 105 use different clock input signals operating on different clock frequencies, control interface 102 can adjust the amount of power dissipated by element 100.

In operation, control logic 106 selects a particular device 103 or 105 to execute instructions or perform operations during a designated interval in response to selection signal 104. Local clock logic 108 allows a lower frequency clock signal to be supplied to device 105 while device 103 retains the same frequency of clock input as main clock signal 107. Element 100 may therefore operate in a reduced power dissipation mode by using the data path encompassed by device 105 rather than device 103.

Devices 103 and 105 are supplied with an identical voltage input $V_1$. However, alternate voltage inputs could be provided for each device to offer an even greater differential in the power dissipated by devices 103 and 105. Devices 103 and 105 can be identical or functionally equivalent devices or combinations of components as discussed above in reference to devices 98 and 99 of FIG. 8. Thus, device 105 may have greatly reduced power dissipation by being composed of components dissipating less power than those in device 103, being supplied with a lower frequency clock input and/or being supplied with a lower voltage input.

Although the present invention and its advantages have been described in detail, it should be understood that various changes, substitutions, and alterations can be made therein without departing from the spirit and scope of the present invention as defined by the appended claims.

What is claimed is:

1. A method for selective allocation of power to elements of a circuit, comprising:

identifying at least one element of the circuit for reduced power dissipation;

selecting the identified at least one element; and reducing the power supply voltage of the at least one element from a normal operating first voltage to a reduced power operating voltage less than the first voltage.

2. A method for selective allocation of power to elements of a circuit, comprising:

identifying at least one element of the circuit for reduced power dissipation;

selecting the identified at least one element; and reducing the frequency of a clock signal input to the at least one element from a normal operating first frequency to a nonzero second frequency.

3. A method for selective allocation of power to elements of a circuit, comprising:

identifying at least one element of the circuit for reduced power dissipation comprising identifying at least one transistor;

selecting the identified at least one element; and changing a threshold voltage of the identified transistor.

4. A method for selective allocation of power to elements of a circuit, comprising:

identifying a first device and a second device coupled in parallel, the second device dissipating less power than the first device;

during normal power operation selecting the first device; and during reduced power operation selecting the second device.

5. The method of claim 4, wherein the first device and the second device each using a different power supply voltage, the power supply voltage used by the second device being less than the power supply voltage used by the first device.

6. The method of claim 4, wherein the first device and the second device each operating on a different clock frequency, the clock frequency used by the second device being lower than the clock frequency used by the first device.

7. The method of claim 4, wherein the first device and the second device each having different functional components, the components in the second device dissipating less power than the components in the first device.

8. The method of claim 4, wherein the first device and the second device each having a plurality of transistors, the transistors in the second device having a higher threshold voltage than the transistors in the first device.

9. A method for selective allocation of power to elements of a circuit, comprising:

identifying at least one element of the circuit for reduced power dissipation;

selecting the identified at least one element; and altering at least one input to the selected at least one element, the altered input reducing the power dissipated by the element;

wherein the selecting the at least one element step comprises:

sending a selection signal to a register associated with the identified at least one element; and holding the selection signal in the register until the register is reset, the selection signal causing the identified at least one element to operate in a reduced power dissipation mode.

10. A method for selective allocation of power to elements of a circuit, comprising:

identifying at least one element of the circuit for reduced power dissipation;

selecting the identified at least one element;
altering at least one input to the selected at least one element, the altered input reducing the power dissipated by the element; and
wherein the altering at least one input step comprises altering at least one input to the selected at least one element during a specific time interval.

11. A system for the selective allocation of power to elements of an integrated circuit, comprising:
a logic component operable to identify at least one element of the integrated circuit for reduced power dissipation;
a selection signal generated by the logic component operable to select the identified at least one element;
a control interface operable to reduce the power dissipated by the selected element in response to the selection signal; and
wherein the control interface comprises a control logic for selecting either a first power supply voltage or a second power supply voltage in response to the selection signal, the first power supply voltage being less than the second power supply voltage.

12. A system for the selective allocation of power to elements of an integrated circuit, comprising:
a logic component operable to identify at least one element of the integrated circuit for reduced power dissipation;
a selection signal generated by the logic component operable to select the identified at least one element;
a control interface operable to reduce the power dissipated by the selected element in response to the selection signal; and
wherein the control interface comprises a clock logic operable to reduce a frequency of a clock signal used by the at least one element in response to the selection signal.

13. A system for the selective allocation of power to elements of an integrated circuit, comprising:
a logic component operable to identify at least one element of the integrated circuit for reduced power dissipation;
a selection signal generated by the logic component operable to select the identified at least one element;
a control interface operable to reduce the power dissipated by the selected element in response to the selection signal; and
wherein the control interface comprises a voltage regulator operable to modify a threshold voltage of a transistor in the at least one element in response to the selection signal.

14. A system for the selective allocation of power to elements of an integrated circuit, comprising:
a logic component operable to identify at least one element of the integrated circuit for reduced power dissipation, wherein the at least one element comprises a first device and a second device coupled in parallel, wherein the first device and the second device each using a different power supply voltage, the power supply voltage used by the second device being at a lower voltage than the power supply voltage used by the first device;
a selection signal generated by the logic component operable to select the identified at least one element;
a control interface operable to reduce the power by the selected element in response to the selection signal and thereby cause the identified at least one element to enter a reduced power dissipation mode, the control interface comprising a control circuit operable to select the second device in response to the selection signal when entering the reduced power dissipation mode.

15. The system of claim 14, wherein the first device and the second device each use a different power supply voltage, the power supply voltage used by the second device being less than the power supply voltage used by the first device.

16. The system of claim 14, wherein the first device and the second device each operating on a different clock frequency, the clock frequency used by the second device being lower than the clock frequency used by the first device.

17. The system of claim 14, wherein the first device and the second device each having different functional components, the components in the second device dissipating less power than the components in the first device.

18. The system of claim 14, wherein the first device and the second device each having a plurality of transistors, the transistors in the second device having a higher threshold voltage than the transistors in the first device.

19. A system for selectively reducing power dissipation in elements of a circuit, the system comprising:
a logic component operable to identify at least one element of a circuit, the logic component identifying the at least one element in response to analyzing instructions processed by an instruction handler;
a selection signal generated by the logic component operable to select the identified at least one element;
a control interface operable to alter an input to the identified at least one element in response to the selection signal and thereby cause the identified at least one element to enter a reduced power dissipation mode; and
wherein the control interface comprises a power supply interface operable to reduce a voltage input to the at least one element from a normal operating first voltage to a reduced power operating voltage less than the first voltage when entering the reduced power dissipation mode.

20. A system for selectively reducing power dissipation in elements of a circuit, the system comprising:
a logic component operable to identify at least one element of a circuit, the logic component identifying the at least one element in response to analyzing instructions processed by an instruction handler;
a selection signal generated by the logic component operable to select the identified at least one element;
a control interface operable to alter an input to the identified at least one element in response to the selection signal and thereby cause the identified at least one element to enter a reduced power dissipation mode; and
wherein the control interface comprises a clock signal interface operable to reduce the frequency of the clock signal used by the at least one element when entering the reduced power dissipation mode.

21. A system for selectively reducing power dissipation in elements of a circuit, the system comprising:
a logic component operable to identify at least one element of a circuit, the logic component identifying the at least one element in response to analyzing instructions processed by an instruction handler;
a selection signal generated by the logic component operable to select the identified at least one element;

a control interface operable to alter an input to the identified at least one element in response to the selection signal and thereby cause the identified at least one element to enter a reduced power dissipation mode; and wherein the at least one element comprises at least one transistor and the control interface is operable to change a threshold voltage of the at least one transistor when entering the reduced power dissipation mode.

22. A system for selectively reducing power dissipation in elements of a circuit, the system comprising:

a logic component operable to identify at least one element of a circuit, the logic component identifying the at least one element in response to analyzing instructions processed by an instruction handler;

a selection signal generated by the logic component operable to select the identified at least one element;

a control interface operable to alter an input to the identified at least one element in response to the selection signal and thereby cause the identified at least one element to enter a reduced power dissipation mode; and wherein the at least one element comprises a first data path and a second data path coupled in parallel, the second data path dissipating less power than the first data path, and the control interface is operable to select the second data path when entering the reduced power dissipation mode.

23. The system of claim 22, wherein the first device and the second device each using a different power supply voltage, the power supply voltage used by the second device being less than the power supply voltage used by the first device.

24. The system of claim 22, wherein the first device and the second device each operating on a different clock frequency, the clock frequency used by the second device being lower than the clock frequency used by the first device.

25. The system of claim 22, wherein the first device and the second device each having different functional components, the components in the second device dissipating less power than the components in the first device.

26. The system of claim 22, wherein the first device and the second device each having a plurality of transistors, the transistors in the second device having a higher threshold voltage than the transistors in the first device.

* * * * *